INVENTOR
WAYNE W. HAY
ATTORNEY & AGENT

Dec. 16, 1958 W. W. HAY 2,864,363
ANESTHETIC VAPORIZER AND ADMINISTERING APPARATUS
Filed June 25, 1957 3 Sheets-Sheet 3

INVENTOR
WAYNE W. HAY
BY
ATTORNEY & AGENT

United States Patent Office 2,864,363
Patented Dec. 16, 1958

2,864,363

ANESTHETIC VAPORIZER AND ADMINISTERING APPARATUS

Wayne W. Hay, Madison, Wis., assignor to Air Reduction Company, Incorporated, New York, N. Y., a corporation of New York Application June 25, 1957, Serial No. 667,944

10 Claims. (Cl. 128—203)

The present invention relates to vaporizers for anesthesia apparatus.

Where the anesthetic is one which is liquid at ordinary temperatures, it is common to provide a vaporizer for that anesthetic in conventional apparatus for controlling the gas being breathed by a patient undergoing anesthesia. Ether is typical of such anesthetics. The invention will be described herein as applied to ether. However, the description of the invention in that manner is for the sake of convenience in description only and it is not to be understood that the invention is limited to a vaporizer for any particular anesthetic agent.

Anesthetic agents such as ether commonly vaporize very readily and in doing so take up heat from the part of the agent which remains liquid, and from surrounding structures. When an operation continues for a long period of time, the abstraction of heat from the vaporizer and the liquid ether may reduce the temperature of the liquid ether and thereby change its vapor pressure, with a resulting change in the proportion of the anesthetic which is taken up by the gas, usually oxygen, which is passed through the vaporizer. Such changes in the proportions of oxygen and ether require attention to the apparatus on the part of the anesthetist, in order to maintain the proportions within the desired range.

It has been proposed to overcome this difficulty by providing thermostatic apparatus for controlling the proportions of ether and oxygen so as to compensate for changes in temperature. However, such thermostatic apparatus tends to increase the complexity of the system and to require regular careful maintainance procedures. It also does not eliminate the necessity for supervision by the anesthetist.

It is an object of the present invention to provide a vaporizer for use in anesthesia apparatus which will maintain a substantially constant ratio of ether to oxygen over an extended period of time, without attention on the part of the anesthetist and without the use of thermostatic devices.

The foregoing and other objects of the invention are attained by providing a vaporizer including a tank for the liquid anesthetic agent comprising an upper wide portion with two relatively narrow vertical tubes projecting downwardly from its bottom and joined together at their lower ends by a horizontal tube. The tank with its tubes are preferably constructed as a unitary casting, preferably made of brass or other material having high heat conductivity. The walls of the casting should be made fairly thick so as to give it substantial thermal capacity. The volumetric capacity of the tank should be made high as compared to the volume of ether used in a typical operation, so that the excess liquid ether also serves to increase the thermal capacity of the vaporizer as a whole.

The tank is filled with ether substantially above the level of its bottom. Oxygen is bubbled into the vaporizer through a trap so that the bubbles first appear at the bottom of one of the two vertical tubes. The bubbles move upwardly through that vertical tube to the surface of the other, picking up ether vapor as they move vertically. An outlet tube opens into the space above the ether surface. The passages of bubbles through the one vertical tube creates a circulation of ether upwardly through that tube into the tank and laterally through the tank, down through the other vertical tube and across through the horizontal tube into the inlet tube. This circulation prevents any stratification of the ether in the tank due to the development of different temperatures at different levels. It also keeps the entire body of ether in the tank stirred and tends to maintain a uniform temperature throughout the liquid ether. This continual stirring brings all parts of the liquid into contact with the walls of the tank. The ether itself is a poor conductor of heat, whereas the walls of the tank are good conductors, so that the liquid ether is thereby maintained more nearly at the temperature of the tank walls.

Other objects and advantages of the invention will become apparent from a consideration of the following description and claims, taken together with the accompanying drawings:

FIGURE 1

Figure 1:
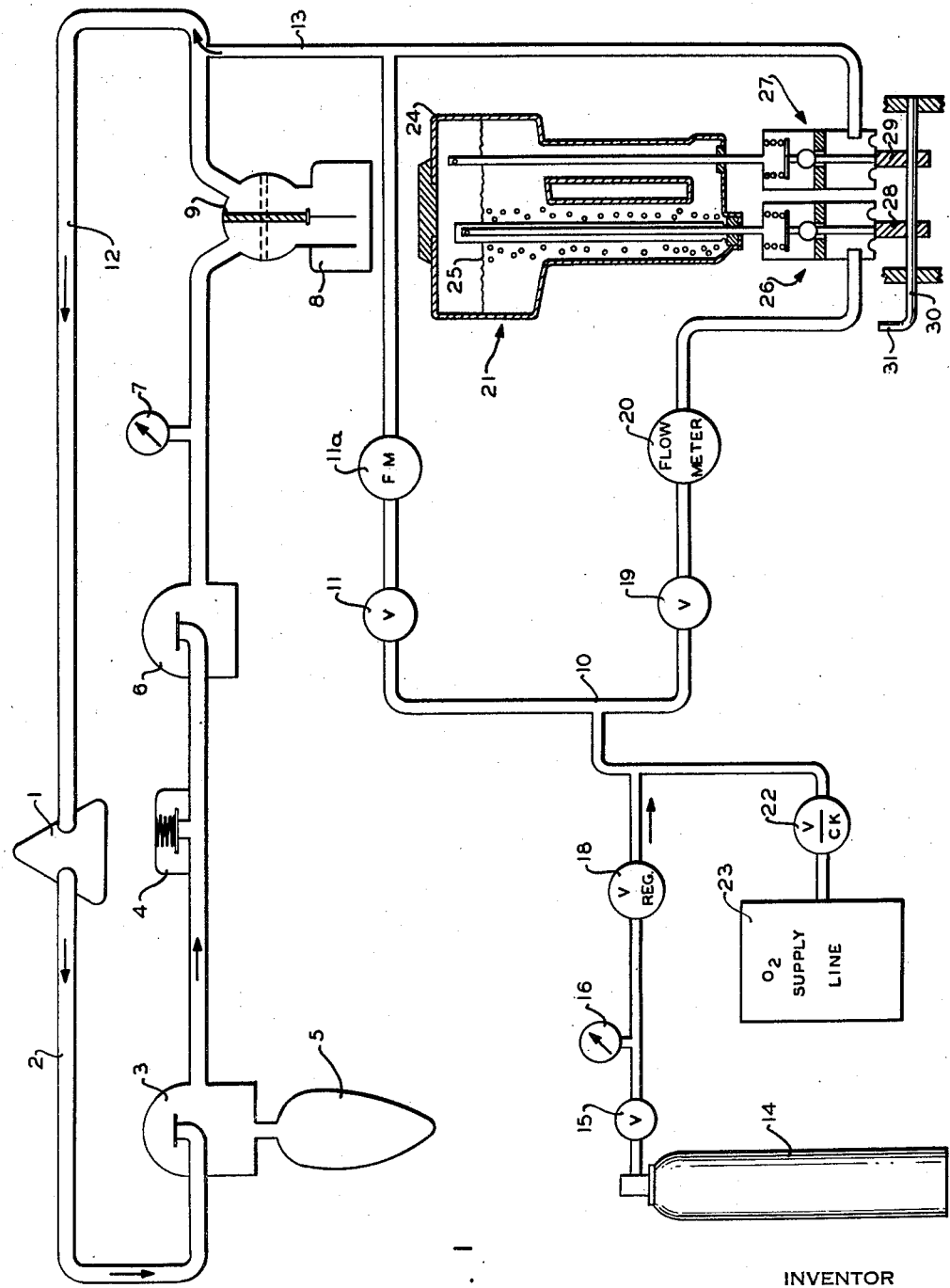
Fig. 1 is a diagrammatic illustration of a complete anesthesia apparatus of conventional type including a vaporizer which may be constructed in accordance with the present invention.

This figure illustrates conventional closed circuit anesthesia apparatus including a mask 1, an exhalation tube 2, an exhalation check valve 3, a pressure relief valve 4, a rebreathing bag 5, an inhalation check valve 6, a pressure gage 7, a soda lime canister 8 for absorbing carbon dioxide, a canister bypass valve 9, and an inhalation tube 12 connected to the mask 1. A mixture of oxygen and ether is supplied to the closed circuit through a fresh gas supply line 13.

The closed circuit apparatus as described above includes the canister 8 to absorb the carbon dioxide breathed out by the patient. All other components of the patient's breath are recirculated through the inhalation tube 12. Fresh oxygen and entrained anesthetic vapor are supplied through the line 13.

The apparatus for supplying oxygen includes an oxygen cylinder 14, a manual valve 15 controlling the flow of gas from the cylinder, a cylinder pressure gage 16, and a pressure regulator 18 which discharges into a manifold 10. As an alternative to the cylinder 14 and its related valve mechanisms, the oxygen supply may include a check valve 22, which connects the manifold 10 to a main oxygen supply line 23. This type of supply is typical of large hospitals having a centralized oxygen supply system.

Oxygen flows from the manifold 10 either through a needle valve 19, a flow meter 20, and an ether vaporizer generally indicated at 21, and also through a needle valve 11 and a flow meter 11a.

Figure 2:
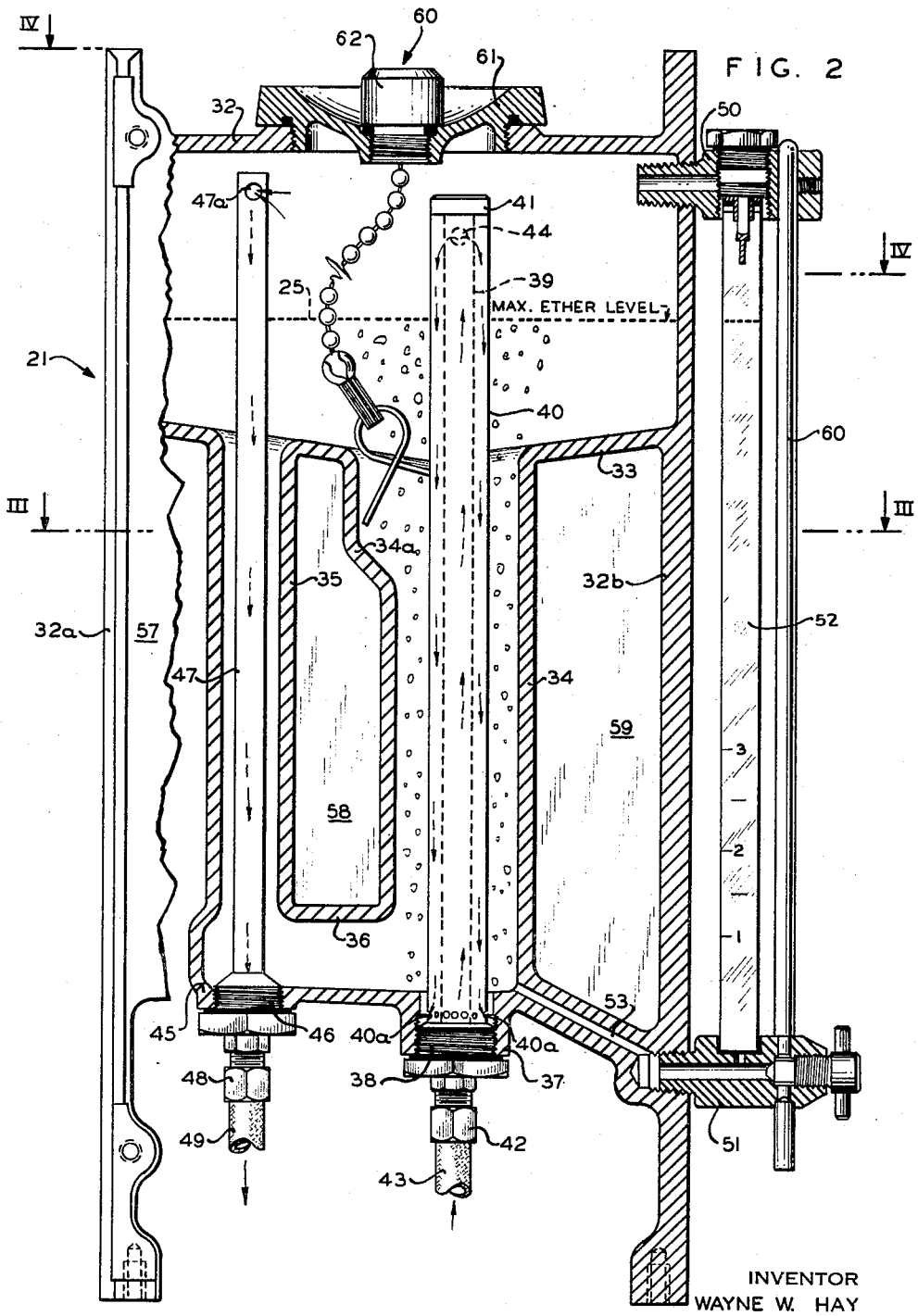
Fig. 2 is a view, partly in vertical section and partly in elevation, showing a vaporizer constructed in accordance with the invention.
Figure 3:
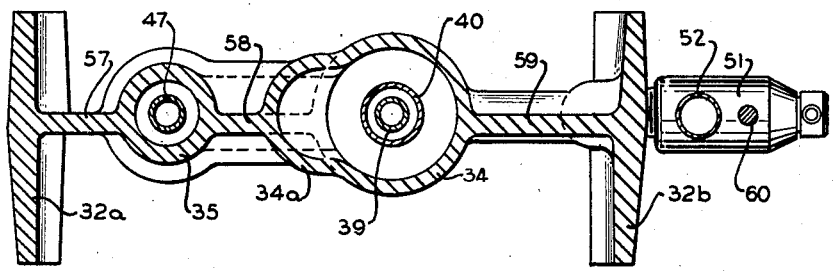
Fig. 3 is a cross-sectional view taken on the line III—III of Fig. 2, looking in the direction of the arrows.
Figure 4:
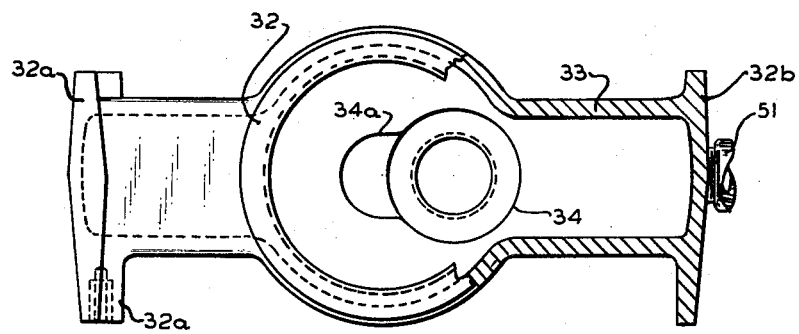
Fig. 4 is a view partly in plan and partly in section on line IV—IV of Fig. 2, showing the vaporizer casting only with the other parts removed.

The vaporizer 21 may be constructed in accordance with the present invention and is shown in Fig. 1 as comprising a tank 24 partially filled with ether as shown by the maximum liquid level at 25, an inlet valve 26 and an outlet valve 27. The valves 26 and 27 are spring biased to closed position and are positively opened concurrently by means of cams 28 and 29 respectively fixed on a shaft 30 provided with a crank handle 31. The vaporizer 21 is illustrated only schematically in Fig. 1. Reference is made to Figs. 2, 3 and 4 for a more complete description of the vaporizer structure.

FIGURES 2, 3 and 4

The vaporizer 21 comprises a unitary casting 32. The liquid containing parts of this casting include an upper horizontally elongated tank portion 33, a tube 34, extending downwardly from the tank 33 and hereinafter referred to as the inlet tube, another tube 35 extending downwardly from the tank 33 and a tube 36 extending horizontally and connecting the lower ends of the tubes 34 and 35. In addition to the liquid containing parts, the casting 32 includes side flanges 32a and 32b (see Figs. 3 and 4), and webs 57, 58, 59 connecting the tubes and the side flanges.

At the lower end of the tube 34 there is provided in the casting a downwardly projecting boss 37, which is hollow and internally threaded to receive an externally threaded pipe coupling 38. On the inner side of the pipe coupling 38 there is mounted an inlet trap structure including two vertically extending concentric pipes 39 and 40. The upper ends of the pipes 39 and 40 are closed by a plug 41. The lower end of the inner pipe 39 opens through the coupling 38 to a nipple 42 adapted for receiving the end of a flexible conduit 43. The upper end of the pipe 39 is provided with one or two apertures 44 which communicate with the inside of the outer pipe 40. The outer pipe 40 is provided at its lower end with a plurality of small apertures 40a, spaced around the periphery of the pipe 40.

At the lower end of the tube 35, the casting is provided with another boss 45, which is hollow and internally threaded and in which is received an externally threaded pipe coupling 46. On the inner side of the coupling 46 is mounted an outlet pipe 47 which extends upwardly through the tube 35 to a locality above the maximum ether level 25. The upper end of the tube 47 is provided with one or more apertures 47a through which a mixture of oxygen and ether vapor is drawn from the space above the ether level 25. The pipe 47 communicates through the coupling 46 with an external nipple 48 which is adapted to receive the end of a flexible conduit 49.

The casting 32 is provided along one side with a projecting flange 32a, best seen in Fig. 4, by means of which it may be mounted on any suitable support. The other side of the casting 32 is provided with a flange 32b. The flanges 32a and 32b extend the full length of the casting 32. The upper and lower ends of the flange 32b are threaded to receive pipe couplings 50 and 51 which support between them a gage glass 52, for the purpose of indicating the level of ether in the vaporizer. The pipe coupling 50 opens directly into the tank 33. A guard rod 60 extends between the couplings 50 and 51 and has its ends received in suitable apertures in the couplings. The pipe coupling 50 opens directly into the tank 33. A drilled passage 53 connects the inner end of the coupling 51 and the lower end of the tube 54.

The casting as a whole, including the flanges and webs, serves as a reservoir of heat which may be supplied as required to the ether in the vaporizer, and provides a large area to intercept such radiated heat as may be available to it.

The bottom of the tank portion 33 slants downward toward the tube 34, as illustrated in the drawings, in order to ensure drainage of the tank bottom. In a similar manner, the bottom of the horizontal tube 36 is slanted downward so that it drains into the bottom of the tube 34. The pipe coupling 46 fills the aperture in the boss 45 substantially completely, so that little or no liquid can collect around the coupling 46. The coupling 48 on the other hand has its threaded portion substantially shorter than the aperture in the boss 37, so that an annular space inside the boss 37 is left open around the bottom of the pipe 40, and opposite the apertures 40a.

The drainage arrangements just described are provided for the purpose of ensuring that as ether is used from the vaporizer, all the ether that remains drains down into the bottom of the inlet tube. The vaporizer remains effective to substantially saturate the flowing oxygen with ether even when there is only a small volume of ether left in the vaporizer. Successful tests have been run with as little as 20 cc. of ether in the bottom of the vaporizer. Of course, under such conditions, the circulation of ether through the tubes 34 and 35, described below, stops as soon as the level drops below the upper end of those tubes.

The upper end of tube 34 is expanded on one side, as shown at 34a, to provide space for receiving the bottom end of a thermometer which may be inserted through the filler cap, which is generally indicated at 60. The cap 60 is a double cap including an outer cap 61 which threads into a hole in the top of the casting 32. The upper surface of the cap 61 is funnel-shaped. The inner cap 62 is threaded through a suitable aperture at the center of the cap 61. The cap 61 is only opened when a larger access opening is needed, as for cleaning.

The vaporizer shown and described herein is intended to have a high capacity for liquid ether, i. e., approximately 600 cc. This large volume of liquid ether provides an additional heat reservoir and further tends to stabilize the temperature of the liquid ether during vaporization.

Operation

Oxygen or other gas vehicle for carrying the anesthetic vapor is supplied through the tube 43 and passes through the trap comprising the inner pipe 39 and the outer pipe 40. This trap is provided in order to prevent backflow of ether in the inlet conduit 43. The gas passes downwardly through the outer pipe 40 and issues through the apertures 40a as small bubbles which move vertically through the tube 34 to the surface of the ether. The gas with a mixture of ether entrained is carried out through the aperture 47a and the outlet pipe 47 leading to the outlet 49.

As the bubbles move upwardly through the tube 34 they reduce the effective density of the ether in it. Since the effective density of the ether in tube 35 is not affected, there is a concurrent flow of ether downwardly through tube 35 and to the right as viewed in the drawing, through the tube 36 and up through tube 34, so that the bubbles create a continual flow of ether around the circuit comprising the tubes 34, 35 and 36, and the tank 33. There is thus produced a continuous circulation of ether in the tank which keeps the temperature in all parts of the tank substantially uniform and maintains all of the ether in the tank moving into contact with the walls of the casting as it circulates.

It has been found that a vaporizer of the type described, operating in a room at 72° F., maintained the temperature of the effluent vapor substantially constant over a long period of time. For example, for an oxygen flow of 50 cc. per minute, and starting with an effluent vapor concentration of 63%, the effluent vapor concentration fell to approximately 58½% in the first twenty-five minutes. This initial drop in temperature established a stable condition of heat flow through the vaporizer and for a period of 3½ hours thereafter the temperature of the effluent vapor dropped less than one-half percent.

It has been found that, in anesthesia apparatus using a vaporizer constructed in accordance with the invention, the ether flow may be controlled sufficiently closely with the one vaporizer, utilizing the usual needle valves as control instrumentalities, so that a secondary vaporizer, commonly connected in the closed circuit in conventional apparatus, may be omitted. The desired concentration of ether vapor is achieved by dilution of the output of the vaporizer with other gases, such as oxygen from the valve 11 and flowmeter 11a.

While I have shown and described a preferred embodiment of my invention, other modifications thereof will readily occur to those skilled in the art and I, therefore, intend my invention to be limited only by the appended claims.

I claim:
1. In an anesthesia machine, a vaporizer for mixing the vapor of a volatile liquid anesthetic agent with a gas vehicle, comprising a tank having a substantial length in at least one horizontal direction, two vertical tubes extending downwardly from said tank and in fluid communication therewith at their upper ends, a generally horizontally extending tube connecting the bottom ends of said vertical tubes, gas inlet means at the bottom of one of said vertical tubes, mixture outlet means above the maximum liquid level, and means for supplying gas to said inlet means, said gas bubbling upwardly through said one tube and thereby entraining said vapor, the upward movement of gas being effective to cause a circulation of liquid up through said one tube, laterally through said tank, down through said other tube and laterally through the horizontal tube to the bottom of said one tube.

2. A vaporizer as defined in claim 1, in which the bottom of the tank is slanted to drain into said one tube.

3. A vaporizer as defined in claim 2, in which said horizontally extending tube is slanted downwardly to drain into said one tube.

4. A vaporizer as defined in claim 1, in which said tank and said tubes are formed as a single casting.

5. A vaporizer as defined in claim 4, in which said casting comprises a web extending between said tubes.

6. A vaporizer as defined in claim 5, in which said casting comprises mounting flanges at the ends of said tank and extending vertically downward therefrom, and additional webs extending between said mounting flanges and the adjacent tubes.

7. A vaporizer as defined in claim 1, including an outlet tube extending vertically through said other tube, and a pipe coupling connected to said outlet tube and threaded into the bottom of said other tube.

8. A vaporizer as defined in claim 1 in which said gas inlet means includes an inlet fitting disposed at the bottom of one of said vertical tubes, adapted to be connected externally with gas supply means, an inner gas delivery conduit connecting at its bottom with said inlet fitting, extending upwardly through said vertical tube to a level above the maximum liquid level and open at its upper end, an outer conduit surrounding said inner delivery conduit, closed at its upper end and forming a vertically extending gas passage connecting with the upper open end of said inner delivery conduit, and means forming an opening between said vertically extending passage and the bottom of said vertical tube whereby inlet gas is admitted to the bottom of said vertical tube and liquid in said vaporizer is prevented from entering said gas delivery conduit.

9. A vaporizer as defined in claim 1, comprising a mounting flange extending downwardly from one end of said tank, a web extending between the bottom end of said flange and the adjacent tube, a passage between said mounting flange and the lower end of said one tube, pipe couplings at the top of said tank and at the bottom of said flange and respectively in communication with said tank and said passage, and a gage glass mounted between said couplings and having its ends in fluid communication with said couplings.

10. Anesthetic administering means for administering controllable, substantially constant concentrations of an inhalant anesthetic vapor in admixture with a carrier gas comprising a source of a carrier gas under pressure, a vaporizer including a tank defining a confined vaporizing chamber adapted to be filled to a pre-determined maximum level with a volatile anesthetic liquid, two vertical tubes extending downwardly from said vaporizing chamber forming downwardly extending portions of said chamber, passage means inter-connecting said tubes substantially at the lower ends thereof, delivery conduit means including flow adjusting means connecting said source of carrier gas with the bottom of one of said vertical tubes, an outlet communicating with said vaporizing chamber above said maximum liquid level therein, discharge conduit means connecting said outlet to an anesthetic administering circuit for inhalation by a patient, separate valve means in said delivery conduit and discharge conduit operatively arranged for simultaneous operation, and conduit means by-passing said vaporizer and connecting said gas source to said anesthetic administering circuit, including adjustable flow control valve means, whereby the amount of anesthetic vapor and of said carrier gas administered to said patient may be relatively adjusted.

No references cited.